Patented Jan. 13, 1948

2,434,247

UNITED STATES PATENT OFFICE 2,434,247

PRODUCTION OF ELASTIC NYLON ARTICLES

John Richard Lewis, David McCreath, and Reginald John William Reynolds, Blackley, Manchester, England, assignors to Imperial Chemical Industries Limited, a corporation of Great Britain No Drawing. Application July 23, 1945, Serial No. 606,700. In Great Britain August 15, 1944

5 Claims. (Cl. 8—115.5)

This invention relates to the modification of the properties of filaments, bristles, yarns, films and the like shaped articles derived from fibre-forming synthetic linear polyamides (nylons), and more particularly to the modification of such articles by reaction with formaldehyde and an alcohol.

The synthetic linear polyamides are of two general types, namely, those derived from polymerisable monoaminomonocarboxylic acids or their amide-forming derivatives, including lactams, for example, polymeric 6-amino-caproic acid, 7-amino-heptanoic acid, 9-aminononanoic acid or 11-amino-undecanoic acid, and those derived from diamines and dicarboxylic acids or amide-forming derivatives of dibasic carboxylic acids, for example polytetramethylene sebacamide, polypentamethylene adipamide, polypentamethylene sebacamide, polyhexamethylene adipamide, polyhexamethylene sebacamide. These polyamides (including the corresponding interpolyamides and mixed polyamides) are obtainable according to the methods described in British specifications Nos. 461,236, 461,237, 474,999 and 495,790. The polyamides are generally fibre-forming when they have an intrinsic viscosity of 0.4 or more, intrinsic viscosity being defined as $$\frac{\log_e \eta r}{C}$$

in which $\eta r$ is the viscosity of a dilute solution (e. g. 0.5% concentration) of the polyamide in meta-cresol divided by the viscosity of meta-cresol in the same units and at the same temperature (e. g. 25° C. and C is the concentration in grams of polyamide per 100 cc. of solution. These polyamides can be spun, for example, melt spun, into filaments or bristles which can be cold drawn to as much as four or five times their original length. The filaments can be formed into threads or yarns which can be similarly extended by cold drawing.

It is disclosed in British specification No. 534,698 that filaments, fibres, bristles, films, fabrics, and the like derived from synthetic linear polyamides may be given an increased recovery from deformation and an increased resistance to the degradative action of ultra-violet light by a process which comprises treating them with formaldehyde or a formaldehyde-liberating compound. In this prior specification emphasis is directed to the use of articles which have been considerably extended by cold drawing and the methods of effecting the treatment include those wherein the articles are soaked in solutions of formaldehyde, removed and subsequently baked at 100–150° C. for a short time; it is said that the preferred medium for carrying out the treatment is water or other oxygenated organic liquids such as alcohols or ketones, and that catalysts of a weakly acidic or basic nature may be used.

In the specification of British application No. 6808/44 (U. S. Serial No. 587,432, filed jointly Apr. 9, 1945, by David McCreath and John Richard Lewis, now abandoned), there is proposed a process for the production of elastic articles which comprises heating undrawn filaments, bristles, yarns, films and like shaped articles derived from a nylon in the presence of an alcohol, formaldehyde and/or polyoxymethylene or paraformaldehyde and certain catalysts, until the nylon is modified to such an extent that it contains at least 4% of combined formaldehyde based on the weight of the nylon. The articles so treated become endowed with a high degree of elasticity, that is to say, of recovery from stretch.

The mechanism of the reactions involved in the modification of the nylon articles when working according to this prior proposal is believed to be as follows:

(1) Formaldehyde reacts with some of the amide groups forming methylol groups; and (2) The methylol groups are, simultaneously or subsequently, entirely or in part, etherified by interaction with the alcohol used.

These reactions may be indicated graphically as follows:

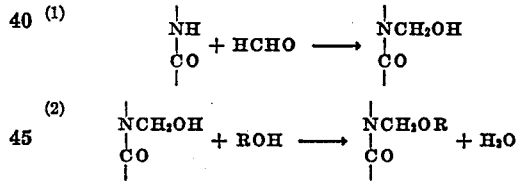

A third reaction may also take place which results in the linking together of nylon molecules by the formation of the following groupings, $x$ being a small whole number:

(3) 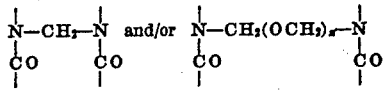

When nylons are to be modified by reaction with an alcohol and formaldehyde it has been customary hitherto to use the several reagents as or in liquid media.

We have now found that in the production of elastic articles by modifying undrawn filaments, bristles, yarns and like shaped articles derived from a nylon by reaction with an alcohol and formaldehyde in presence of an acidic catalyst it is advantageous to use the formaldehyde in the form of a vapour.

Thus, according to the present invention in a process for the production of elastic articles by heating undrawn filaments, bristles, yarns, fabrics films and like shaped articles derived from a nylon in the presence of an alcohol, formaldehyde and an acidic catalyst, we provide the improvement which comprises using the formaldehyde in the form of a vapour. By a further feature of the invention we provide a process for the production of elastic articles which comprises heating undrawn filaments, bristles, yarns, fabrics, films and like shaped articles derived from a nylon in the presence of a volatile monohydric alcohol, formaldeyhde and an acidic catalyst, the alcohol and the formaldehyde both being in the form of a vapour.

As indicated, the shaped articles which are to be treated according to the process of the invention are those of such a structure that a large surface area can be exposed to the action of the several reagents. The said articles may be derived wholly or in part from the nylon, for example, in a woven fabric, the weft may be formed from nylon yarn and the warp from some other material.

The expression "undrawn" as used herein indicates that the articles have not been cold-drawn during their production or that, at most, they have been only slightly cold drawn.

Suitable alcohols include aliphatic monohydric alcohols which may or may not contain other substituents, for example. methyl alcohol, ethyl alcohol, propyl alcohol, iso-propyl alcohol, n-propyl alcohol, n-butyl alcohol, iso-butyl alcohol, octyl alcohol, dodecyl alcohol, methallyl alcohol, castor oil fatty acids, and cyclo-hexanol; polyhydric alcohols, for example, ethylene glycol, diethylene glycol and $\beta:\beta'$-dihydroxyethyl sulphide; ethers of polyhydric alcohols which contain free hydroxyl groups, for example, ethylene glycol monomethyl ether, ethylene glycol monoethyl ether; and aromatic-aliphatic alcohols, for example, benzyl alcohol. Mixtures of alcohols may be used if desired. Particularly suitable alcohols are the monohydric alcohols and of these volatile monohydric alcohols, that is to say, monohydric alcohols with boiling points below 120° C., are the most useful for the purposes of the present invention. The preferred alcohol is methyl alcohol.

Suitable catalysts include acids or acid-reacting salts or mixtures of acids and/or acid-reacting salts, for example, phosphoric acid, ammonium dihydrogen phosphate, oxalic acid, maleic acid, glycollic acid, lactic acid and citric acid. These acidic catalysts are usually used in the form of solutions thereof, usually containing from 1–40%, preferably 10–30%, of the catalyst, but optimum concentrations vary with the nature of the catalyst, the operating conditions and the results desired, and they are conveniently determined by trial. Suitable solvents for the acidic catalysts include water or alcohols or mixtures of these, or inert volatile organic liquids, for example, ethylene dichloride and dioxan.

The modifying reaction may be carried out in a number of ways. Preferably, the nylon articles are first impregnated with the acidic catalyst, for example, by means of a solution thereof, and then heated whilst exposed to formaldehyde and a volatile monohydric alcohol both in the form of vapour. The proportion of formaldehyde in the vapour mixture may be as much or more than that of the volatile alcohol and proportions as low as 5% by weight of the mixture may be used. In vapour mixtures containing equal quantities by weight of formaldehyde and alcohol the proportions are approximately equimolecular. If desired, the nylon articles may be impregnated with a volatile monohydric alcohol or a non-volatile monohydric alcohol or a mixture containing proportions of both of these as well as with the acidic catalyst and subsequently heated, whilst exposed to the formaldehyde in the form of vapour, in the presence or absence of a volatile monohydric alcohol also in the form of a vapour. Whatever the conditions used for effecting the modifying reaction it is essential, however, to ensure that the nylon articles are in contact with the alcohol and the formaldehyde and the acidic catalyst at least during part of the heating. It is also essential to ensure that the heating is effected under substantially anhydrous conditions; for instance, when the nylon articles are impregnated with a solution of the acidic catalyst in water or in an aqueous alcohol, the water should be removed from the articles, for example, by drying, prior to the heating in presence of the other reagents.

The temperatures and times of heating are interdependent, the higher the temperature the shorter the time of heating and the lower the temperature the longer the time of heating, but they vary considerably with the nature of the reagents being used and with the effects it is desired to produce. The temperature of heating will usually be from 80 to 150° C., preferably from 100 to 120° C., and the time of heating from 5 to 60 minutes, preferably from 10 to 30 minutes. The best conditions are conveniently determined by trial.

Formaldehyde in the form of vapour may be obtained in any conventional manner provided that care is taken to avoid water or to remove any water vapour present. Conveniently, a polymeride of formaldehyde for example paraformaldehyde, trioxymethylene or trioxane is heated in the presence of a trace of alkali. If desired the vapours may be used in conjunction with inert diluents for example, nitrogen or carbon dioxide, and the vapours of volatile organic liquids such as benzene or xylene. Conveniently also, a mixture of formaldehyde and of a volatile monohydric alcohol both in the form of vapour may be obtained by heating a mixture of paraformaldehyde and a volatile monohydric alcohol, for example, a mixture containing equal proportions thereof. When such mixtures or mixtures containing unequal proportions are heated in an open system, formaldehyde distills from the mixtures; this may provide a convenient manner of adjusting the proportions of formaldehyde and volatile monohydric alcohols in mixed vapours to be used for the purposes of this invention.

The process of the invention is well adapted to be operated in a continuous manner, and at atmospheric, reduced or elevated pressures.

The articles to be treated according to the process of the invention may be suspended loosely in the vapour or vapours or they may be used in the form of a package, for example, yarn wound on to a bobbin or other similar carrier; it is important that the packages be such that the whole of the articles to be treated will be exposed to the action of the vapour or vapours.

If desired additional ingredients may be incorporated with the liquid reagents used in the modifying reaction; these include wetting, dispersing or swelling agents. Also, such agents may be used in the form of pre-treating baths. Suitable agents include water-soluble long chain quaternary ammonium salts, for example, cetyl pyridinium bromide, or salts of the sulphuric esters of long chain alcohols, for example, sodium cetyl sulphate.

After modification in accordance with the invention the articles may be washed or treated with other finishing agents and/or subjected to any mechanical finishing operation. For instance, the modified articles may be subjected to a stretching as by cold-drawing. When the articles are stretched, usually, part of the extension is permanent and part is recoverable; the greater the recoverable extensibility the better is the elasticity of the article. Stretching almost to the breaking point results in the maximum permanent and recoverable extensions and thus allows the elastic properties of the articles to be fully developed.

The nylon articles which have been modified in accordance with the process of the invention usually contain at least 4% of combined formaldehyde based on the weight of the nylon, as may be determined by heating the articles, in an acidic hydrolysing liquid, for example, in aqueous sulphuric acid, and estimating the amount of formaldehyde liberated by analysing the resulting solution therefor.

The nylon articles which have been modified in accordance with the process of the invention have a high degree of elasticity, especially so when they have a relatively high combined-formaldehyde content, that is to say, about 9% or more. Moreover, the process is simple in operation and is readily reproducible, partly at least because the use of formaldehyde in the form of a vapour facilitates its reaction with the nylon rather than with itself and/or other reagents used. Further, the modification of the nylon articles by reaction with vapours rather than with liquid media minimises the risk of degradation of the surface or deformation due to swelling.

The invention is illustrated but not limited by the following examples in which the parts are expressed by weight, unless otherwise stated:

EXAMPLE I

Undrawn polyhexamethylene adipamide yarn (den'er 245) is steeped in an aqueous solution of an acidic catalyst for 15 minutes, the solution being kept at a temperature of 50° C., removed, freed from adhering liquid by squeezing, and then dried by heating in air at 120° C. for a short time; the hot yarn is then suspended in a mixture of formaldehyde and methyl alcohol in vapour form. After treatment in this way the yarn is removed from the vapour mixture, washed well with a dilute aqueous alkali and with water, and it is then dried.

Operating conditions and the results obtained are set forth in the table.

Table

| No. | Catalyst used, expressed as per cent on weight of solution | Temperature of vapours in °C. | Time of Exposure to vapours in minutes | Maximum extension as per cent | Extension after relaxation as per cent | Reversible extension as per cent |
| --- | --- | --- | --- | --- | --- | --- |
| 1 | Untreated | | | 300 | 260 | 11 |
| 2 | 20% ammonium dihydrogen phosphate | 110–120 | 30 | 110 | 10 | 90 |
| 3 | 10% maleic acid | 110 | 15 | 200 | 30 | 130 |
| 4¹ | 30% glycollic acid | 110–120 | 15 | 190 | 5 | 176 |

¹ The yarn so treated has a combined-formaldehyde content of 16.4% and a methoxyl content of 9.1%.

The amount of combined formaldehyde in the yarn is determined as follows:

Samples of the treated yarns are heated at 60° C. for 2–3 hours in 4–5% aqueous sulphuric acid; this destroys any linking groups, the methoxymethyl groups and the hydroxymethyl groups with the liberation of formaldehyde. The liquid is brought to neutrality by the addition of aqueous sodium hydroxide, excess of a 15% aqueous solution of sodium sulphite is added, and the heating is continued for a further hour. The liberated formaldehyde interacts with the sodium sulphite giving rise to chemically equivalent quantities of sodium hydroxide and of the formaldehyde-sodium bisulphite-addition-compound. Thence, by estimating the amount of sodium hydroxide present in the liquid by titration with standard acid, the amount of formaldehyde liberated from the sample is determinable.

The methoxyl content is determined by the conventional Zeisel method.

The figures set forth in the 5th, 6th and 7th columns of the table are determined as follows:

The treated material is extended almost to its breaking point; this gives maximum extension which is expressed as a percentage of the original length. The tension is released and the material relaxes; these extensions after relaxation are likewise expressed as a percentage of the original lengths. The retractions obtained are completely or almost completely reversible; they are expressed as percentages of the original length + the extension after relaxation. These figures for the reversible retractions (or extensions) provide the best means of comparing the elasticity of the several samples obtained in accordance with the recipes of the example; as will be seen by inspection reversible extensions considerably greater than the original lengths of the yarns are obtained.

The vapour mixture of formaldehyde and methyl alcohol used in this example is obtained by distilling a mixture of equal parts of paraformaldehyde and methyl alcohol until vapours distilling therefrom consist of approximately equal parts of formaldehyde and methyl alcohol and then cycling this vapour mixture over the yarn.

Example II

A skein of undrawn polyhexamethylene adipamide yarn (denier 320) is steeped for 15 minutes at room temperature in a solution prepared by heating 25 parts of anhydrous oxalic acid in 75 parts of aqueous methyl alcohol (20 parts of water to 80 parts of methyl alcohol by volume) until dissolved, and then cooling the solution to room temperature. The skein is then removed, freed from adhering liquid by squeezing and dried at about 40° C. for 30 minutes. The skein is heated up to 100° C. and exposed to the vapours of formaldehyde and methyl alcohol at this temperature for 10 minutes. The treated skein is removed from the vapours, washed well with water until neutral and then dried at about 40° C.

The vapour mixture of formaldehyde and methyl alcohol used in this example is obtained by distilling a mixture of equal parts of paraformaldehyde and methyl alcohol until the vapours distilling therefrom contain formaldehyde and methyl alcohol in the proportions of 18:82 by weight, and then cycling this vapour mixture over the skein.

The so modified yarn has the following properties:

Tensile strength at break
 grams per denier__ 0.60
Maximum extension_____ per cent__ 203
Extension after relaxation_____do____ 20
Reversible extension_____do____ 151
Combined-formaldehyde content_____do____ 10.2
Methoxyl content_____do____ 7.9

Example III

A skein of undrawn polyhexamethylene adipamide yarn (denier 320) is steeped for 15 minutes at room temperature in a solution prepared by heating 25 parts of oxalic acid and 15 parts of dodecyl alcohol in 60 parts of aqueous methyl alcohol (20 parts of water to 80 parts of methyl alcohol by volume). The skein is then removed, freed from adhering liquid by squeezing, dried, heated up to 100° C., and exposed to the vapours of formaldehyde and methyl alcohol at this temperature for 15 minutes. The treated skein is removed from the vapours, washed with water until neutral and then dried at about 40° C.

The vapour mixture of formaldehyde and methyl alcohol used in this example is obtained by distilling a mixture of equal parts of paraformaldehyde and methyl alcohol until the vapours distilling therefrom contain formaldehyde and methyl alcohol in the proportions of 25:75 by weight, and then cycling this mixture over the skein.

The so modified yarn has the following properties:

Tensile strength at
 break_____grams per denier__ 0.41
Maximum extension_____per cent__ 186
Extension after relaxation_____do____ 15
Reversible extension_____do____ 149
Combined-formaldehyde content_____do____ 11.0

Example IV

The recipe of Example II is repeated except that the skein is exposed to the mixed vapours of formaldehyde and iso-butyl alcohol (instead of to the mixed vapours of formaldehyde and methyl alcohol) for 15 minutes at 120° C.

The vapour mixture of formaldehyde and iso-butyl alcohol used in this example is obtained by distilling a mixture of equal parts of paraformaldehyde and iso-butyl alcohol until the vapours distilling therefrom contain formaldehyde and iso-butanol in the proportion of 11:89 by weight, and then cycling this mixture over the skein.

The so modified yarn has the following properties:

Tensile strength at
 break_____grams per denier__ 0.91
Maximum extension_____per cent__ 170
Extension after relaxation_____do____ 40
Reversible extension_____do____ 93

Example V

A skein of undrawn polyhexamethylene adipamide yarn (denier 320) is steeped for 15 minutes at room temperature in a solution prepared by heating 25 parts of anhydrous oxalic acid in 75 parts of aqueous methyl alcohol (20 parts of water to 80 parts of methyl alcohol by volume) until dissolved and then cooling the solution to room temperature. The skein is then removed, freed from adhering liquid by squeezing and dried at about 40° C. for 30 minutes. The yarn is then wound on to perforated tube, and the assembly is heated up to a temperature of about 100° C. Mixed vapours of formaldehyde and methyl alcohol are passed through the perforations and thus into contact with the yarn for 30 minutes whilst the assembly is maintained at 100° C. The assembly is removed from the vapours, the yarn washed thoroughly with water and dried by exposure to warm air. The yarn is wound off the tube on to a bobbin, the winding being effected under sufficient tension to cause stretching of the yarn by about 100% of its original length. The yarn is maintained in this stretched condition for 24 hours. By this procedure permanent set is removed from the yarn.

The so modified yarn has a combined-formaldehyde content of 10.3% and a reversible extension of 154%.

The vapour mixture of formaldehyde and methyl alcohol used in this example is obtained by distilling a mixture of equal parts of formaldehyde and methyl alcohol until the vapours distilling therefrom contain formaldehyde and methyl alcohol in the proportions of 18:82 by weight.

Example VI

Undrawn monofil derived from the interpolyamide obtained from hexamethylene diammonium adipate (40 parts) hexamethylene diammonium sebacate (30 parts) and epsilon-aminocaprolactam is steeped for 15 minutes at room temperature in a 30% aqueous solution of glycollic acid. The monofil is removed, freed from adhering liquid by squeezing and dried. The monofil is heated up to 120° C. and exposed to a mixture of formaldehyde and methyl alcohol vapours at this temperature for 5 minutes. The treated monofil is removed from the vapours, washed thoroughly with water and dried in air at about 40° C.

The vapour mixture of formaldehyde and methyl alcohol used in this example is obtained by distilling a mixture of equal parts of paraformaldehyde and methyl alcohol until the vapours therefrom contain formaldehyde and methyl alcohol in equal proportions by weight, and then cycling this mixture over the monofil.

The so modified monofil has substantially no permanent set and a reversible extension of 230%; it has a combined-formaldehyde content of 7.0%.

EXAMPLE VII

Fabric woven from a warp of viscose rayon and a weft of undrawn polyhexamethylene adipamide yarn is steeped for 15 minutes at room temperatures in a 30% aqueous solution of glycollic acid, removed, squeezed to remove excess of solution and dried. The fabric is heated up to 115° C. and exposed to the mixed vapours of formaldehyde and methyl alcohol at this temperature for 15 minutes. The treated fabric is removed from the vapours, washed in 1% caustic soda, washed well with water and dried.

The vapour mixture of formaldehyde and methyl alcohol used in this example is obtained by distilling a mixture of equal parts of paraformaldehyde and alcohol until the vapours therefrom contain formaldehyde and methyl alcohol in the proportion of 40:60 by weight, and then cycling this mixture over the fabric.

The so modified fabric has a high degree of elasticity in the direction of the weft.

EXAMPLE VIII

Fabric woven from undrawn polyhexamethylene adipamide yarn (denier 320) is steeped for 15 minutes at room temperatures in a solution prepared by heating 25 parts of anhydrous oxalic acid in 75 parts of aqueous methyl alcohol (20 parts of water to 80 parts of methyl alcohol by volume). The fabric is removed, freed from adhering solution by squeezing and dried. The fabric is heated up to 100° C., and exposed to the mixed vapours of formaldehyde and methyl alcohol at this temperature for 15 minutes. The fabric is removed from the vapours, washed with 1% caustic soda solution, washed with water and dried.

The vapour mixture of formaldehyde and methyl alcohol used in this example is obtained by distilling a mixture of equal parts of paraformaldehyde and methyl alcohol until the vapours distilling therefrom contain formaldehyde and methyl alcohol in the proportion of 25:75 by weight, and then cycling this mixture over the fabric.

The so modified fabric has a combined-formaldehyde content of 11.0% and is elastic in both the warp and weft direction.

We claim:

1. A process for obtaining elastic nylon articles which comprises heating under substantially anhydrous conditions at a temperature of from 80° C. to 150° C. the nylon article in essentially undrawn state in the form of a filament, bristle, yarn, and the like in contact with an acidic catalyst, a volatile monohydric alcohol in the form of a vapor, and formaldehyde in the form of a vapor, and continuing said heating until the nylon contains on the basis of its weight at least 4% of combined formaldehyde.

2. A process for obtaining elastic nylon articles which comprises impregnating the nylon article in essentially undrawn state in the form of a filament, bristle, yarn and the like with a solution of an acidic catalyst, heating the impregnated article at a temperature of from 80° C. to 150° C. under substantially anhydrous conditions in contact with a mixture of the vapors of formaldehyde and of monohydric alcohol, and continuing said heating until the nylon contains on the basis of its weight at least 4% of combined formaldehyde.

3. The process set forth in claim 1 in which said alcohol is methyl alcohol.

4. The process set forth in claim 2 in which said alcohol is methyl alcohol.

5. The process set forth in claim 1 in which said alcohol is methyl alcohol and in which said temperature is from 100 to 120° C.

JOHN RICHARD LEWIS.
DAVID McCREATH.
REGINALD JOHN WILLIAM REYNOLDS.

REFERENCES CITED

The following references are of record in the file of this patent:

UNITED STATES PATENTS

| Number | Name | Date |
| --- | --- | --- |
| 995,852 | Eschalier | June 20, 1911 |
| 2,177,637 | Coffman (1) | Oct. 31, 1939 |
| 2,275,008 | Coffman (2) | Mar. 3, 1942 |
| 2,311,080 | Pinkney | Feb. 16, 1943 |